United States Patent [19]
Mims

[11] Patent Number: 5,367,245
[45] Date of Patent: Nov. 22, 1994

[54] ASSEMBLY FOR THE INDUCTION OF LIGHTNING INTO A SUPERCONDUCTING MAGNETIC ENERGY STORAGE SYSTEM

[76] Inventor: Goren Mims, 19790 SW. 101 Ct., Miami, Fla. 33157

[21] Appl. No.: 985,649

[22] Filed: Dec. 7, 1992

[51] Int. Cl.$^5$ ............................................. H02J 15/00
[52] U.S. Cl. ...................................... 322/212; 307/149
[58] Field of Search .............. 322/2 R, 2 A; 505/868, 505/881, 869; 307/149; 363/14

[56] References Cited

U.S. PATENT DOCUMENTS

| | | | |
|---|---|---|---|
| 674,427 | 5/1901 | Palencsar | 307/149 |
| 911,260 | 2/1909 | Pennock | 307/149 |
| 1,014,719 | 1/1912 | Pennock | 307/149 |
| 3,584,260 | 6/1971 | Barbini | 317/61 |
| 3,701,906 | 10/1972 | Denel et al. | 307/149 |
| 4,122,512 | 10/1978 | Peterson et al. | 363/14 |
| 4,493,014 | 1/1985 | Higashino | 363/14 |
| 4,920,095 | 4/1990 | Ishigaki et al. | 322/2 R X |
| 4,926,061 | 5/1990 | Arreola, Jr. | 290/55 |
| 5,194,803 | 3/1993 | Visser et al. | 505/869 X |

*Primary Examiner*—Kristine L. Peckman
*Attorney, Agent, or Firm*—Malloy & Malloy

[57] ABSTRACT

A collection assembly adapted to attract and collect lightning from the atmosphere and channel electrical energy therefrom through a conductor to a storage facility defined by an extremely large coil housed within a congruently configured trench formed in the ground wherein the storage coil is formed of a superconductive material. A first conductive pathway serves to interconnect the collection facility defined by the lightning attracting structure to the storage coil. A second conductive path serves to interconnect the storage coil to a power take-off means which may be standard and conventional power lines directing current to areas of practical application. Both the first and second conductive paths are preferably formed of superconductive material.

14 Claims, 1 Drawing Sheet

ASSEMBLY FOR THE INDUCTION OF LIGHTNING INTO A SUPERCONDUCTING MAGNETIC ENERGY STORAGE SYSTEM

BACKGROUND OF THE INVENTION

1. Field of the Invention

This invention relates to a system for collecting electrical energy from lightning in the surrounding atmosphere and channeling such electrical energy to a storage facility formed of a superconductive material coil of sufficient size, dimension and structural adaptation to store significantly large amounts of electrical energy to be used in a practical sense and wherein such stored electrical energy can be released on demand from the storage coil and used for practical application as desired and needed.

2. Description of the Prior Art

For years man has been attempting to find an effective and inexpensive source of energy which is capable of operating the various energy consuming facilities associated with modern day living, commerce and technology. A prime factor in utilizing energy sources is the protection of the environment through the use of non-polluting energy sources. Nuclear fuel, while gaining increasing acceptance in past years, is currently looked upon as somewhat of a dangerous form of electrical energy due to a recent major accident involving a nuclear generating plant and the common occurrence of plant breakdown and possible leakage of toxins into the surrounding environment.

Man has long acknowledged however the unlimited source of electrical energy which occurs during the creation of Lightning during storms and like or similar atmospheric conditions. Attempts have been made to harness such electrical energy as evidenced by the early 1900, U.S. Pat. Nos. to Pennock, 911,260 and 1,014,719. The Pennock patents are directed to facilities for collecting energy from lightning and transferring such energies to some type of storage facility which is referred to in U.S. Pat. No. 911,260 as storage battery structures. The collection facility in this patent relates to metal conductive material spheres interconnected and/or supported in an upwardly suspended position by one or more lighter than air structures, such as balloons. A conventional conductor of metallic materials serves to define a flow path of electrical energy from the collecting facility down to the storage battery.

Similarly Pennock discloses in his U.S. Pat. No. 1,014,719 a plurality of balloons which may be elongated metallic structures filled with some type of lighter than air gas used to support an electrical grid or the like. Further the conductors utilized in this disclosure are designed to transfer the collected electrical energy to some type of collection or storage facility.

The patent to Arreola, U.S. Pat. No. 4,926,061 is directed to a windmill structure rather than any type of facility that is specifically adapted to collect energy from a lightning source. A generator or some type of electrical energy creating device is driven by the windmill type device shown in certain drawings of this patent. Storage facilities such as battery packs are the initial and preferred embodiment for storing electricity in this invention. However, the inventor does specifically mention that the use of superconductivity for maximum generation of electricity and magnetic shielding is also contemplated.

An additional U.S. Patent to Higashino, U.S. Pat. No. 4,493,014 discloses the use of a superconductive storage apparatus for electrical power. In FIG. 1 of this patent the conventional and or known prior art device is depicted in FIG. 2, by comparison, this patent shows an improvement over the known prior art which is depicted and explained. It is important to note that in the recognized prior art system of FIG. 1 and in the so called improved system of FIG. 2 both systems are connected to what may be generally referred to as a conventional A.C. power source which is interpreted as being a power company or like conventional electrical energy generating facility. Both structures are particularly adapted for the initial storage of electrical energy during "low demand" periods and the return of the stored electrical energy to the system schematically indicated in FIGS. 1 and 2 of this patent once demand increases. It is specifically stated in both systems that the storage facility may be defined by a superconductive structure which is connected to some type of conversion unit wherein the initially supplied electrical energy is an A.C. form and then converted to D.C. form for storage. The patent to a large extent concentrates on the conversion unit per se and means of controlling the flow of electrical energy for purposes of storage and/or resupplying it to the system.

Similarly the patent to Peterson et al, U.S. Pat. No. 4,122,512 discloses a superconductive energy storage facility for power systems. This patent emphasizes that while the storage facility is a superconductive magnet with an auxiliary refrigeration system used in combination therewith to prevent overheating, the initial energy source is a conventional alternating current power system connected to the superconductive magnet. The energy is stored in the magnetic field which is produced by the superconductive magnet. The magnetic energy can be converted into electrical energy and returned to the power system as needed. There is no suggestion of combining the superconductive coil with a collection facility which is specifically adapted to trap, transport and control the energy from a lightning source. More importantly this patent as well as the remaining patents cited herein detail no specific description of a superconductive coil which is large enough to be mounted in a ground supporting area at least the size of a standard football field so that significant quantities of energy can be stored and used as desired and wherein such electrical energy is specifically captured from the atmosphere through the attraction of lightning during conducive atmospheric conditions. With regard to the Pennock patents the use of superconductive materials in practical application to store large amounts of energy was not contemplated or certainly developed to the standpoint of practicality or efficiency. Therefore there would be no suggestion of utilizing superconductive material in the collection facilities of Pennock since they were developed in the early 1900's.

SUMMARY OF THE INVENTION

This invention relates to a facility specifically adapted to collect electrical energy from the atmosphere by attracting lightning to a collection assembly. The collection assembly, in one preferred embodiment, comprises a conductive material rod or rod type structure similar to a conventional "lightning rod" which is raised above the ground a pre-determined height by means of being mounted on a support structure. The support structure of course could take a variety of different configurations including a specifically built support tower. Obviously other support structures or assemblies such as buildings or the like could be utilized.

An important part of the present invention is the existence of a storage assembly in the form of a circular or otherwise closed, continuously configured coil of extremely large dimensions. While not limited to such dimensions such storage coil is generally the size of a football field and is mounted in a recessed position within a congruently configured trench in a supporting ground surface. Importantly, the coil is formed of a superconductive material and is structurally adapted to store large amounts of current and deliver such stored current, on demand to a power take-off means such as conventional power lines for the effective distribution of the stored electrical energy to practical application.

In order to accommodate the superconductive storage coil a refrigeration assembly is associated directly with the housing or trench for the coil. Such refrigeration assembly is of course operated as a separate unit and is disposed in direct fluid and heat transferring communication to the coil. The coil, because of its size and of course the fact that it is formed from the superconductive material must have proper refrigeration in order to maintain it at pre-determined, operative, reduced temperatures.

Similarly, the conductive current pathways leads from the collection facility, which attracts lightning and directs current to the storage coil and may also be formed of the aforementioned superconductive material and accordingly must be properly refrigerated or cooled to the pre-determined, operative temperature. A second conductive path leading from the storage coil to the power take-off means may also be formed of the aforementioned superconductive material and accordingly must be exposed to adequate refrigeration to reduce the overall working environmental temperature of the superconductive material to the aforementioned pre-determined operative temperatures.

Other features associated with the present invention include a surge arrestor assembly associated with the collection assembly and disposed, preferably, in interconnecting relation between a conductor extending between the lightning rod and the first conductive path formed of superconductive material. Such surge arrestor assembly has an automatic switching facility built therein such that alternately when the storage coil has adequate amounts of energy stored therein, the electrical energy from the lightning collected may be channeled directly to ground instead of through the first conductive pathway.

Other structures and assemblies may be associated with the subject collection and storage facility and may include a converter means disposed in conductive communication or connection with the second conductive pathway and disposed and structurally adapted to convert the electrical energy taken from the storage coil from a D.C. current to an A.C. current so that such A.C. current may be transferred directly to the power take-off means or power distribution lines for practical application. In conjunction therewith, a transformer facility may also be disposed in conductive attachment so as to reduce or regulate the voltage of the current directed to the power take-off or power lines for practical distribution.

BRIEF DESCRIPTION OF THE DRAWINGS

For a fuller understanding of the present invention reference should be had to the following detailed description taken in connection with the accompanying drawing:

The single figure attached hereto is a schematic representation of the various components of the subject assembly for the induction of lightning into a superconducting magnetic energy storage system.

DETAILED DESCRIPTION OF THE PREFERRED EMBODIMENT

Figure 1:
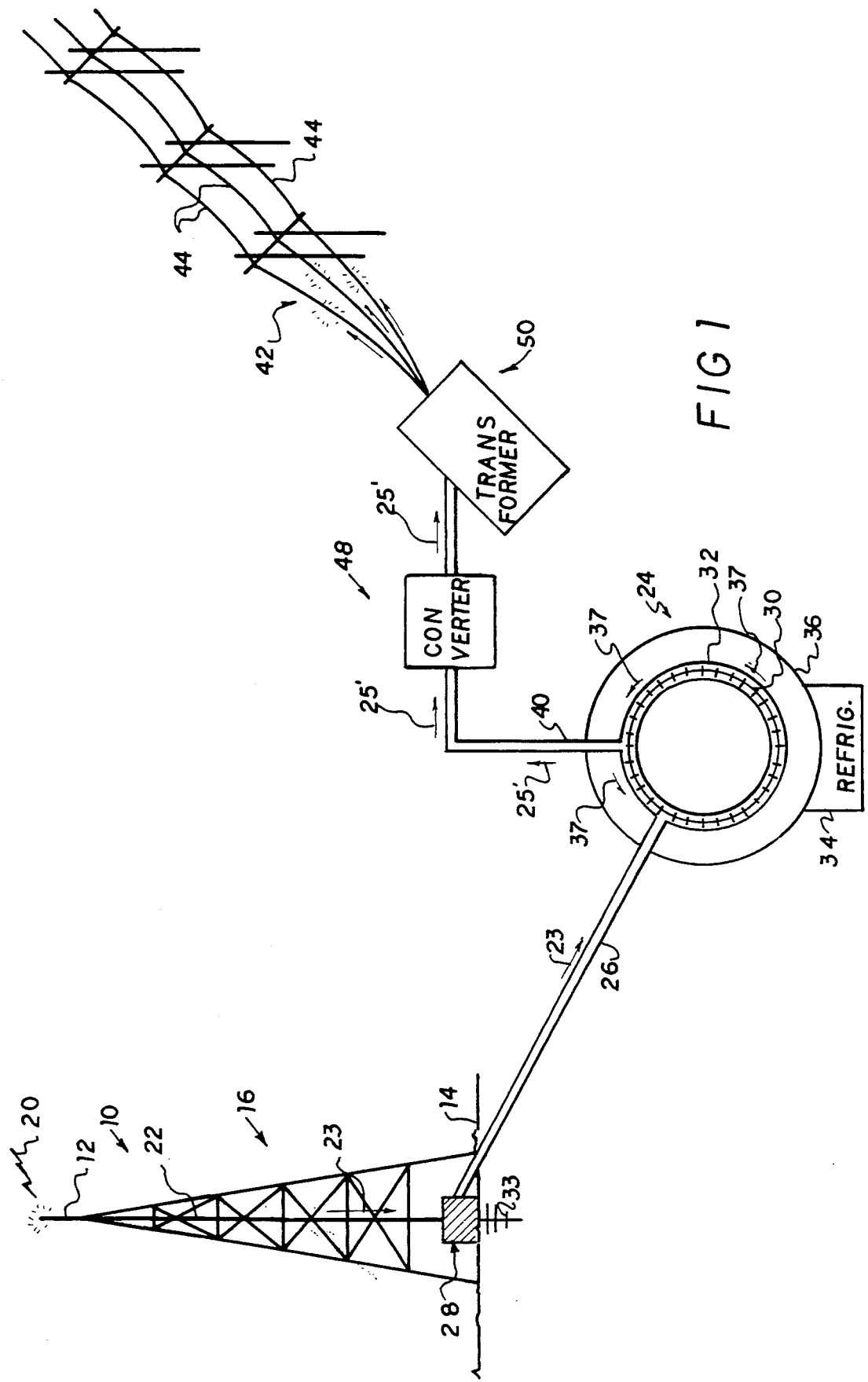

As shown in the single figure to be described in greater detail hereinafter the subject assembly for the induction of lightning into a superconducting magnetic energy storage system is shown schematically. More specifically, a collection assembly is generally indicated as 10 and comprises some type of lightning attracting structure as at 12. Such structure can be in the form of an elongated lightning rod generally somewhat similar to the lightning rods which are normally used to direct the electrical energy to ground when protecting buildings and like structures. The lightning attracting member or rod 12 is mounted above a supporting ground surface as at 14 by an adequate support structure generally indicated as 16. As shown, such support structure may be in the form of a specifically constructed tower which is raised to a height efficiently productive for the collection of lightning. Schematically represented as at 20 to the lightning attracting rod 12. Once attracted the result is electrical current being directed by means of a conductor as at 22 downwardly through the support structure 16 and eventually towards the storage coil generally indicated as 24.

The path of travel of the now collected or captured electrical energy, in current form is indicated by directional arrows 23 and 25'.

A first conductive path as at 26 is disposed in interconnecting, conductive communication between the conductor means 22 associated with the support tower 16 and the storage coil 24. Such first conductive path 26 is preferably formed of a superconductive material similar to that to be described in greater detail with reference to the collection coil 24. The structural adaptation of the first conductive pathway 26 is such as to direct current flow from the collection facility 16 to the storage coil 24 after first passing the current through a surge arrestor assembly generally indicated as 28. Such surge arrestor assembly is connected directly to ground as at 33 and has a switching assembly (not shown for purposes of clarity) which may or may not comprise superconductive switches. This switching assembly, being a structural adaptation of the surge arrestor assembly 28 serves automatically to direct current flow either to the first conductive pathway 26 and eventually to the storage coil 24 when such conductive path is "open". Alternately when it is not intended or desired for the electric current to be fed to the storage coil 24 for storage thereof such captured or collected electrical current from the lightning 20 is passed directly to ground as at 33 to surge arrester 28. The surge arrestor 28 is of course also structurally adapted to prevent any damage to the conductive components associated with the storage system due to a large surge of current passing through the system.

The collection coil 24, as set forth above is formed of a superconductive material. The coil has a continuous, substantially closed configuration and is indicated more specifically as at 30. The coil is buried or otherwise housed in a submerged fashion within a trench as at 32. The trench is congruently figured as to the coil 30 and is formed in some type of supporting ground surface or building structure such that the superconductive coil 30 is properly shielded, supported and protected.

It is well known that in order to efficiently operate the superconductive material and to take benefit of it's characteristic operative properties, the coil 30 must be maintained at a substantially reduced temperature. Accordingly a refrigeration assembly as at 34 is disposed in direct communication with the overall surrounding housing as at 36 so as to direct a continuous flow of refrigerated or cooled air therethrough in direct heat transferring relation to the coil 30 within the trench 32. Circulation or exposure of the refrigerated air or like gas or fluid is maintained constantly to maintain the overall reduced temperature for efficient operation.

Current flow continuously passing along the length of the closed coil 30 is indicated by the directional arrows 37. Upon need or use of the stored electrical energy, proper switching means are activated (not shown for purposes of clarity) and the stored current is directed along a second pathway as at 40. The second pathway is also formed of a superconductive material and accordingly both the first and second pathways 26 and 40 respectively are maintained under a substantially reduced temperature environment. Current flow from the coil of the electrical current is indicated by the directional arrows 25'. The second conductive path 40 is disposed in conductive attachment between the storage coil 30 and what may be generally referred to as a power take-off means generally indicated as 42. The power take-off means may take the form of conventional power lines as at 44 structurally adapted to efficiently distribute the stored electrical energy for practical application in a conventional manner.

Ancillary components of the subject induction superconductive storage system include the provision of a converter means generally indicated as 48. The converter is connected directly to the second conductive pathway 40 and is structurally adapted to convert current coming from the collection coil 30 from D.C. to A.C. mode. From there the AC current is directed to a transformer means generally indicated as 50 for the purpose of regulating voltage before the current is directed into the power take-off means 42 and the power line 44 for practical distribution and use.

Now that the invention has been described:
What is claimed is:

1. An assembly designed for collection and storage of electrical energy, said assembly comprising:
   a) a collection assembly structured and disposed to attract lightning and transfer electrical current therefrom,
   b) a storage assembly formed of a superconductive material and structured and disposed to store said electrical current therein,
   c) a power take-off means structured and disposed to distribute said electrical current for use,
   d) a first conductive path interconnected between said collection assembly and said storage assembly and defining a path of electrical current flow and structured and disposed to transfer said electrical current from said collection assembly to said storage assembly,
   e) a second conductive path interconnected between said storage assembly and said power take-off means and defining a path of electrical current flow and structured and disposed to transfer said electrical current from said storage assembly to said power take-off means, and
   f) said first and second conductive path each defining a flow path of said electrical current and each formed of a superconductive material.

2. An assembly as in claim 1 wherein said collection assembly comprises a rod member formed of electrically conductive material and a support structure attached in supporting relation to said rod member and structured and disposed to position said rod member at a predetermined raised height above a supporting surface.

3. An assembly as in claim 2 wherein said support structure comprises a tower assembly mounted on and extending upwardly from a supporting ground surface.

4. An assembly as in claim 2 wherein said rod member is attached to an upper end of said tower assembly and said collection assembly further comprising conductor means mounted on said support structure and attached to and interconnecting said rod member and said first conductive path.

5. An assembly as in claim 4 further comprising a surge arrester means connected to said conductor means upstream of said first conductor path and structured and disposed for arresting a surge of said electrical current passing from said rod member through said conductor means.

6. An assembly as in claim 5 further comprising switching assembly structured and disposed to direct said electrical current from said conductor means to either said first conductor path or ground.

7. An assembly as in claim 5 wherein said surge arrester means is mounted in interconnecting relation between said conductor means and said first conductor path, as well as between said conductor means and ground.

8. An assembly as in claim 1 further comprising converter means connected to said second conductor path and structured and disposed to convert D.C. electrical current received from said storage assembly through said second conductive path to A.C. electrical current.

9. An assembly as in claim 8 wherein said converter means is connected to said second conductive path intermediate said collection assembly and said power take-off means.

10. An assembly as in claim 8 further comprising transformer means interconnected between said second conductive path and said power take-off means and structured and disposed to regulate voltage output of said electrical current from said second conductive path to said power take-off means.

11. An assembly as in claim 9 includes transformer means interconnected between said second conductive path and said power take-off means and structured and disposed to regulate voltage output of said electrical current from said second conductive path to said power take-off means.

12. An assembly as in claim 1 wherein said collection assembly comprises a closed, continuously configured coil formed of superconductive material and communicating with both said first and second conductive paths.

13. An assembly as in claim 12 wherein said collection assembly comprises a trench structure formed in a supporting ground surface and structured and disposed to receive and house said coil.

14. An assembly as in claim 13 wherein said collection assembly further comprises refrigeration means mounted in communicating, open relation to said coil and said trench and structured and disposed to maintain a reduced temperature of said coil sufficient for effective operation thereof.

* * * * *